(12) United States Patent
Shin et al.

(10) Patent No.: US 12,425,841 B2
(45) Date of Patent: Sep. 23, 2025

(54) METHOD OF TIME SYNCHRONIZATION SERVICE FOR FEDERATED LEARNING IN 5G NETWORK

(71) Applicant: ELECTRONICS AND TELECOMMUNICATIONS RESEARCH INSTITUTE, Daejeon (KR)

(72) Inventors: Myung Ki Shin, Seoul (KR); Jihoon Sung, Daejeon (KR); Soohwan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 408 days.

(21) Appl. No.: 18/098,375

(22) Filed: Jan. 18, 2023

(65) Prior Publication Data

US 2023/0247417 A1 Aug. 3, 2023

(30) Foreign Application Priority Data

Jan. 28, 2022 (KR) .................. 10-2022-0013490
Dec. 23, 2022 (KR) .................. 10-2022-0182590

(51) Int. Cl.
*H04W 8/24* (2009.01)
*H04L 41/16* (2022.01)

(52) U.S. Cl.
CPC .............. *H04W 8/24* (2013.01); *H04L 41/16* (2013.01)

(58) Field of Classification Search
CPC ......... H04W 4/12; H04W 8/24; H04W 60/00; H04L 41/16; H04L 69/24
See application file for complete search history.

(56) References Cited

U.S. PATENT DOCUMENTS

| 2015/0208370 | A1 | 7/2015 | Kim et al. |
| 2017/0141865 | A1 | 5/2017 | Ha et al. |
| 2022/0217526 | A1* | 7/2022 | Zheng ........... H04W 8/183 |

FOREIGN PATENT DOCUMENTS

| KR | 10-2021-0040776 A | 4/2021 |
| KR | 2021-0144213 A | 11/2021 |

OTHER PUBLICATIONS

3GPP TS 23.501 V17.1.1 (Jun. 2021), 3rd Generation Partnership Project; Technical Specification Group Services and System Aspects; System architecture for the 5G System (5GS); Stage 2 (Release 17).

(Continued)

*Primary Examiner* — Sam Bhattacharya
(74) *Attorney, Agent, or Firm* — LRK PATENT LAW FIRM

(57) ABSTRACT

Provided is a method of a time synchronization service for federated learning (FL) in a fifth generation (5G) network. The method includes receiving, by an artificial intelligence/machine learning function (AIMLF), a subscription request for UE capability information for an FL time synchronization service from an artificial intelligence/machine learning application function (AIML AF) and transmitting, by the AIMLF, the UE capability information to the AIML AF, in response to the subscription request.

7 Claims, 4 Drawing Sheets

(56) References Cited

OTHER PUBLICATIONS

3GPP TS 23.502 V17.6.0 (Sep. 2022), 3rd Generation Partnership Project; Technical Specification Group Services and System Aspects; Procedures for the 5G System (5GS); Stage 2 (Release 17).
Marcin Dryjanski, "5G-Advanced: 3GPP Rel-18 SA2 Features", Jan. 11, 2022 <https://rimedolabs.com/blog/5g-advanced-3gpp-rel-18-sa2-features/>.

* cited by examiner

METHOD OF TIME SYNCHRONIZATION SERVICE FOR FEDERATED LEARNING IN 5G NETWORK

CROSS-REFERENCE TO RELATED APPLICATIONS

This application claims the benefit of Korean Patent Application No. 10-2022-0013490 filed on Jan. 28, 2022, and Korean Patent Application No. 10-2022-0182590 filed on Dec. 23, 2022, in the Korean Intellectual Property Office, the entire disclosure of which is incorporated herein by reference for all purposes.

BACKGROUND

1. Field of the Invention

One or more embodiments relate to a method of a time synchronization service for federated learning in a fifth generation (5G) network.

2. Description of Related Art

User equipment (UE) in a network (e.g., a fifth generation (5G) network) may join federated learning. Time synchronization among pieces of UE joining federated learning may be needed to perform the federated learning.

Specifically, there may be need for parameters and/or procedures for exposing capability information of a time synchronization service to a 5G system in order to support federated learning between UE and a $3^{rd}$ party application.

The above description has been possessed or acquired by the inventor(s) in the course of conceiving the present disclosure and is not necessarily an art publicly known before the present application is filed.

SUMMARY

Embodiments provide a method of providing a time synchronization service according to an embodiment. The method may provide a procedure for exposing information about a time synchronization capability in order to support federated learning in a fifth generation (5G) system.

According to an aspect, there is provided a method of a time synchronization service for federated learning (FL) of user equipment (UE) in a 5G network, the method including receiving, by an artificial intelligence/machine learning function (AIMLF), a subscription request for UE capability information for an FL time synchronization service from an artificial intelligence/machine learning application function (AIML AF) and transmitting, by the AIMLF, the UE capability information to the AIML AF, in response to the subscription request.

The capability information may include availability of the UE and a capability of the UE for the FL.

The receiving may include receiving, by a network exposure function (NEF), the subscription request from the AIML AF and receiving, by the AIMLF, the subscription request from the NEF.

The transmitting may include transmitting, by the AIMLF, the UE capability information to a network exposure function (NEF) and transmitting, by the NEF, the UE capability information to the AIML AF.

The subscription request may include a data network name (DNN) and single-network slice selection assistance information (S-NSSAI).

The subscription request may further include a list of identifications (IDs) of pieces of the UE.

The list may be intended to limit subscription to the UE capability information of one or more pieces of UE among pieces of the UE.

However, the technical aspects are not limited to the aforementioned aspects, and other technical aspects may be present.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
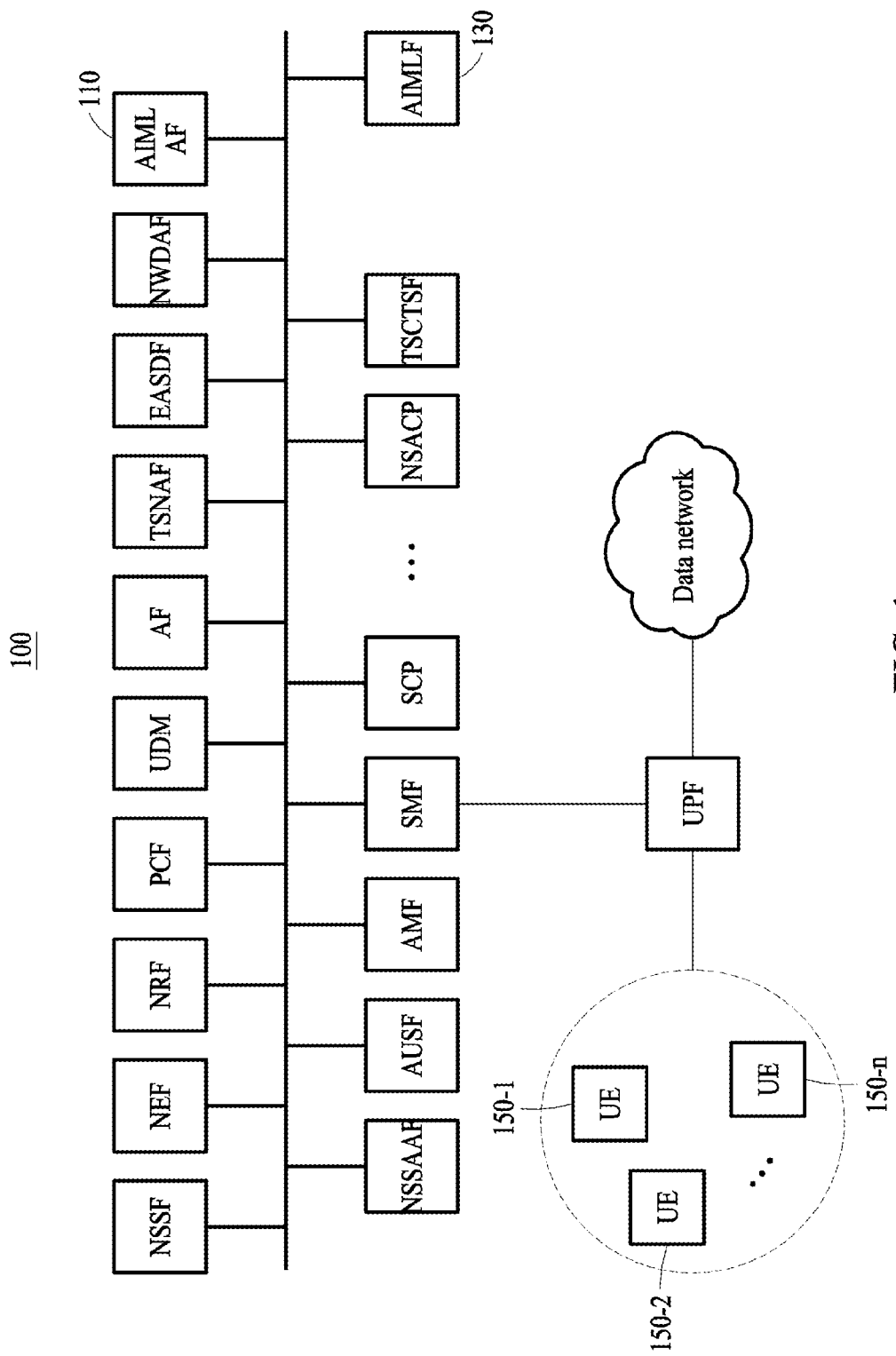
FIG. 1 is a diagram illustrating a fifth generation (5G) system according to an embodiment.

The following structural or functional descriptions of embodiments are merely intended for the purpose of describing the embodiments and the embodiments may be implemented in various forms. Here, embodiments are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

The term "unit" or the like used herein may refer to a software or hardware component, such as a field-programmable gate array (FPGA) or an ASIC, and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, the embodiments will be described in detail with reference to the accompanying drawings. When describing the embodiments with reference to the accompanying drawings, like reference numerals refer to like constituent elements and a repeated description related thereto will be omitted.

FIG. 1 is a diagram illustrating a fifth generation (5G) system according to an embodiment. FIG. 1 may be a diagram illustrating a 5G system (5GS) 100 that provides a time synchronization service for federated learning of user equipment (UE) 150.

Referring to FIG. 1, according to an embodiment, the 5GS 100 may include an artificial intelligence/machine learning application function (AIML AF) 110 and an artificial intelligence/machine learning function (AIMLF) 130. The 5GS 100 may provide a time synchronization service for federated learning, using the AIML AF 110 and/or the AIMLF 130. The 5GS 100 may activate and deactivate the time synchronization service.

For the time synchronization service, the AIML AF 110 may subscribe to UE capability information (e.g., UE availability and UE capabilities) and/or the 5GS 100. For example, the AIML AF 110 may directly transmit a subscription request to the AIMLF 130. In another example, the AIML AF 110 may transmit a subscription request to the AIMLF 130 through a network exposure function (NEF) (e.g., an NEF 220 of FIGS. 2 and 3). Each of the AIML AF 110 and the NEF 220 may discover and select the AIMLF 130 based on a specific procedure (e.g., a procedure prescribed in Section 6.3.24 of the third Generation Partnership Project (3GPP) Technical Specification (TS) 23.501).

The subscription request of the AIML AF 110 may include a data network name (DNN), single-network slice selection assistance information (S-NSSAI), and/or a list of IDs of pieces of UE (e.g., IDs of a UE group). The list of the UE's IDs may be intended to limit subscription to specific UE.

The AIML AF 110 may use (or reuse) time sensitive communication assistance information (TSCAI). The TSCAI may be used to describe time sensitive communication traffic characteristics. The TSCAI may include and/or use the following information (e.g., information prescribed in 3GPP TS 23.501).

TABLE 1

| Assistance Information | Description |
| --- | --- |
| Flow Direction | The direction of the TCS flow (uplink or downlink). |
| Periodicity | It refers to the time period between start of two bursts. |
| Burst Arrival Time (Optional) | The latest possible time when the first packet of the data burst arrives at either the ingress of the RAN (downlink flow direction) or egress interface of the UE (uplink flow direction). |
| Survival Time (Optional) | Survival Time, as defined in TS 22.261 [2], is synonymous with the time period an application can survive without any burst. |

The AIMLF 130 may support a service-based interface (SBI). The AIMLF 130 may receive a request for a time synchronization service from the AIML AF 110, using the SBI. The AIMLF 130 may configure parameters for the time synchronization service based on the subscription request received from the AIML AF 110.

The AIMLF 130 may expose, to the AIML AF 110, the 5GS 100 (e.g., information about the 5GS 100) and/or the UE capability information associated with the time synchronization service. For example, the AIMLF 130 may directly expose the UE capability information and/or the 5GS 100 to the AIML AF 110. In another example, the AIMLF 130 may expose (or transmit) the UE capability information and/or the 5GS 100 to the AIML AF 110 through the NEF 220. Exposed information (e.g., UE capability information and 5GS information) may include a list of UE's IDs and a method of federated learning time synchronization distribution (e.g., 5G clock sync and 5G clock quality).

To control the time synchronization service, the AIMLF 130 may use time synchronization parameters associated with the time synchronization service transmitted from the AIML AF 110. The time synchronization parameters may be transmitted directly from the AIML AF 110 or through the NEF 220. The AIMLF 130 may use (or reuse) TSCAI. The TSCAI may be used to describe TSC traffic characteristics.

The AIMLF 130 may support the following functionalities.

A functionality of associating, with an AIML AF session (e.g., a session between the AIMLF 130 and a policy control function1 (PCF1) 250 and a PCF2 260), a federated learning time synchronization service request from a PCF (e.g., the PCF1 250 of FIG. 2 and the PCF2 260 of FIG. 3) and/or the UE 150.

A functionality related to Quality of Service (QoS) and a time sensitive communication (TSC) assistance container (e.g., creation of a TSC assistance container and determination of 5GS delay)

According to an embodiment, SBI-based services may be specified for the AIMLF 130. For example, the following services may be specified.

Naimlf_TimeSynchronization
1. Support a time synchronization service
2. Allow configuration of UE and/or a 5G core (5GC) for a time synchronization service Naimlf_QoSand TSCAssitance
1. Allow a network function (NF) consumer to provide QoS parameters and/or information to create a TSC assistance container FIG. 2 is a flowchart illustrating a method of exposing time synchronization capability information, according to an embodiment.

Figure 2:
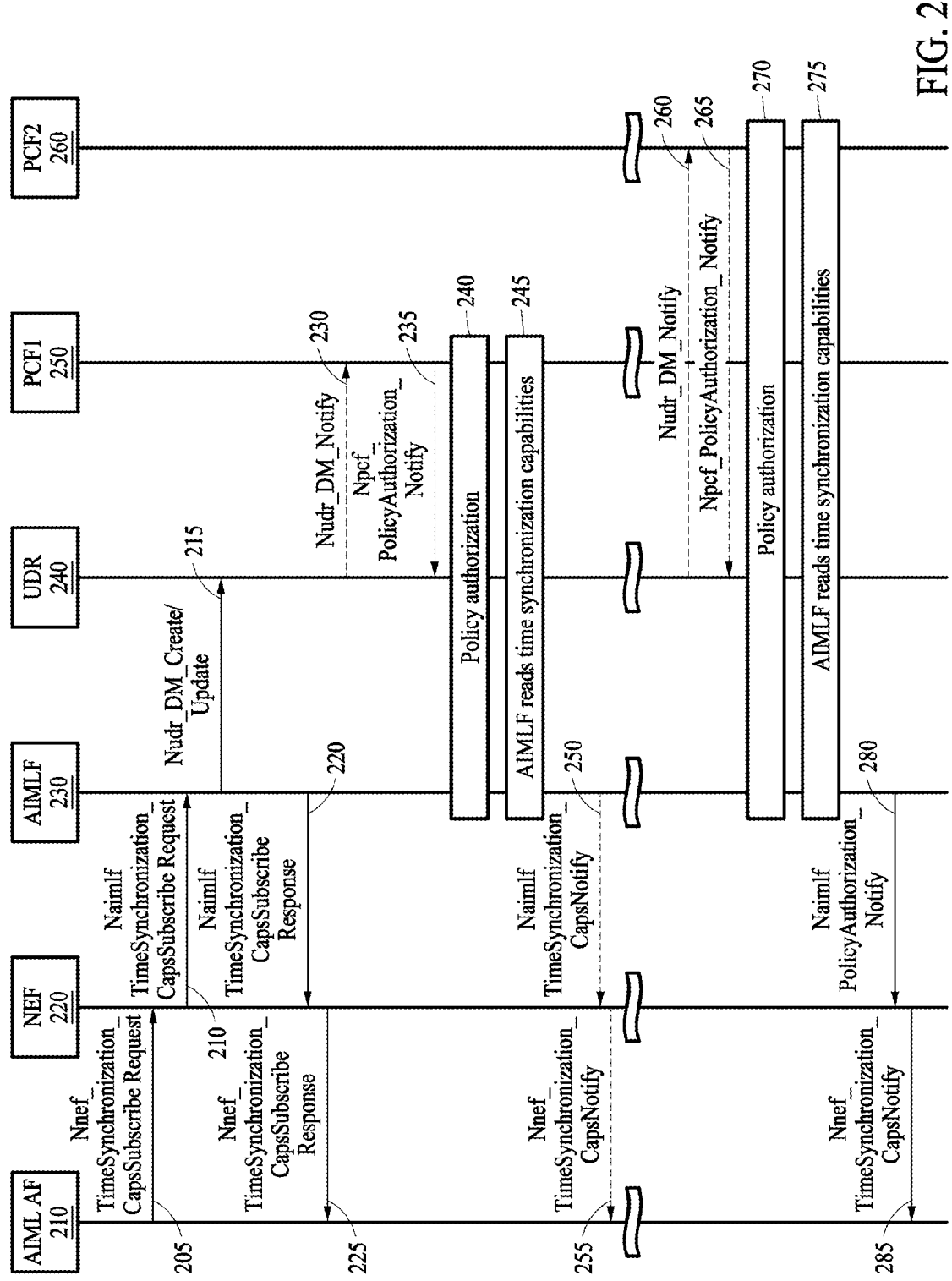
FIG. 2 is a flowchart illustrating a method of exposing time synchronization capability information, according to an embodiment.

Referring to FIG. 2, according to an embodiment, operations 205 to 280 may be performed sequentially, but are not limited thereto. For example, two or more operations may be performed in parallel. In another example, one or more operations may be omitted.

In operation 205, an AIML AF 210 (e.g., the AIML AF 110 of FIG. 1) may subscribe to UE capability information (e.g., UE availability and UE capabilities) and/or a 5GS (e.g., the 5GS 100 of FIG. 1) and/or may transmit Nnef_TimeSynchronization_CapsSubscribe Request. The AIML AF 210 may provide an associated notification target address of the AIML AF 210 through a request (e.g., Nnef_TimeSynchronization_CapsSubscribe Request).

The request of the AIML AF 210 may include a DNN, S-NSSAI, and/or an AIML AF service identifier. When the request of the AIML AF 210 does not include the DNN and/or S-NSSAI, an NEF 220 may determine the DNN and/or the S-NSSAI using the AIML AF service identifier.

An event filter may include a list of UE's ID(s) (e.g., a list of generic public subscription identifier(s) (GPSI(s)) and/or a list of groups of pieces of UE) identified by an external group identifier that further defines a subset of target UE. When the request of the AIML AF 210 does not include the UE's ID(s) and/or the external group identifier, the request of the AIML AF 210 may target any UE having a protocol data unit (PDU) session that uses the DNN and the S-NSSAI. The NEF 220 may include GPSI(s) and/or an external group identifier in the request of the AIML AF 210 and transmit the request of the AIML AF 210 to an AIMLF 230.

An event filter may include at least one of a requested Precision Time Protocol (PTP) instance type, a requested transport protocol for PTP, and a requested PTP profile.

When the NEF 220 processes the request of the AIML AF 210, an AIML AF service identifier may be used to authenticate a Naimlf_TimeSynchronization_CapsSubscribe Request.

When the request of AIML AF 210 does not include a list of UE's ID(s) and/or an external group identifier, the NEF 220 may reject the request based on the AIML AF service identifier and/or the DNN/S-NSSAI.

In order to unsubscribe from the UE capability information for time synchronization with respect to the list of pieces of UE, the AIML AF 210 may invoke a service operation of Nnef_TimeSynchronization_CapsUnsubscribe and provide a subscription correlation ID.

In operation 210, in the case of Naimlf_TimeSynchronization_Caps_Subscribe, the NEF 220 may discover and select the AIMLF 230 based on a specific procedure (e.g., a procedure prescribed in section 6.3.24 of 3GPP TS 23.501). The NEF 220 may invoke a service operation of a Naimlf_TimeSynchronization_CapsSubscribe Request to the AIMLF 230.

In the case of Naimlf_TimeSynchronization_Caps_Unsubscribe, the NEF 220 may determine the AIMLF 230, using the subscription correlation ID, and interact with the AIMLF 230 by triggering the message of a Naimlf_TimeSynchronization_Caps_Unsubscribe Request.

In operation 215, an NF service consumer (e.g., the AIMLF 230) may insert a data record into a unified data repository (UDR) 240. For example, the NF service consumer may insert a new application data record into the UDR 240. The NF service consumer may update data stored in the UDR 240.

In operation 220, the AIMLF 230 may acknowledge the execution of Naimlf_TimeSynchronization_CapsSubscribe to a requester (e.g., the NEF 220). Acknowledgment may include a subscription correlation ID used to cancel and/or modify a subscription.

In operation 225, the NEF 220 may acknowledge the execution of Nnef_TimeSynchronization_CapsSubscribe to a requestor (e.g., the AIML AF 210). Acknowledgment may include a subscription correlation ID used to cancel and/or modify a subscription.

In operation 230, the UDR 240 may notify the NF service consumer of addition, modification, and/or deletion of data (e.g., data of the UDR 240), based on a previous subscription with respect to a notification procedure or a local configuration policy of the UDR 240.

In operation 235, the PCF1 250 may notify an NF service consumer (e.g., the UDR 240) of a subscribed event.

In operation 240, upon establishment of a PDU session, the PCF1 250 may determine whether the PDU session is affected by the time synchronization service based on a local configuration from a session management function (SMF) and/or a 5GS bridge information event. The PCF1 250 may invoke the service operation of Npcf_PolicyAuthorization_Notify to the AIMLF 230. The service operation of Npcf_PolicyAuthorization_Notify may include a UE's address and/or a DNN/S-NSSAI of the PDU session.

The PCF1 250 may register with a binding support function (BSF). The AIMLF 230 may invoke the message of Npcf_PolicyAuthorization_Create Request to the PCF1 250. The AIMLF 230 may store the DNN/S-NSSAI and/or IP address received from the PCF1 250 and a subscription permanent identifier (SUPI) received from the BSF. The AIMLF 230 may associate the DNN, S-NSSAI, IP address, and/or SUPI with an application function (AF) session.

When information about port management information container (PMIC)/user plane node management information container (UMIC) (e.g., information about PMIC/UMIC from a device-side time sensitive networking translator (DS-TT) or a network-side time sensitive networking translator (NW-TT)) is available in the PCF1 250, the PCF1 250 may report the information about PMIC/UMIC to the AIMLF 230 that invokes Npcf_PolicyAuthorization_Notify.

In operation 245, as part of the request of Npcf_PolicyAuthorization Update, the AIMLF 230 may determine (g)PTP capabilities (e.g., (g)PTP capabilities from the DS-TT), using a specific procedure (e.g., the procedure prescribed in section K.2.1 of 3GPP TS 23.501). When the AIMLF 230 does not determine the (g)PTP capabilities from the NW-TT, the AIMLF 230 may determine (g)PTP capabilities, using a specific procedure (e.g., the procedure described in section K.2.1 of TS 23.501).

The AIMLF 230 may compose time synchronization capabilities with respect to DS-TT(s)/UE connected to an NW-TT, based on the DS-TT(s) and the capability information received from the NW-TT. When a Naimlf_TimeSynchronization_CapsSubscribe Request includes an event filter having at least one of a requested PTP instance type, a requested transport protocol for the PTP, and a requested PTP profile, the AIMLF 230 may consider the DS-TT and/or the NW-TT having time synchronization capabilities as part of a time synchronization capability set reported to the NEF 220 and/or the AIML AF 210.

In operation 250, the AIMLF 230 may transmit Naimlf_TimeSynchronization_CapsNotify to the NEF 220. Nflstsf_TimeSynchronization_CapsNotify may include time synchronization capabilities (e.g., the time synchronization capabilities composed in operation 245). For example, Naimlf_TimeSynchronization_CapsNotify may include time synchronization capabilities for one or more user-plane node ID(s), a list of UE's ID(s) related to the user-plane node ID(s), and/or a set of the DS-TT(s) connected to the user-plane node ID(s). The user-plane node ID(s) may identify the NW-TT connecting to UE/DS-TT(s).

In operation 255, the NEF 220 may transmit Nnef_TimeSynchronization_CapsNotify to the AIML AF 210. Nnef_TimeSynchronization_CapsNotify may be transmitted together with a time synchronization capability event.

Operations 260 to 285 may be substantially the same as operations 240 to 255. Accordingly, a description thereof is not repeated herein.

Figure 3:
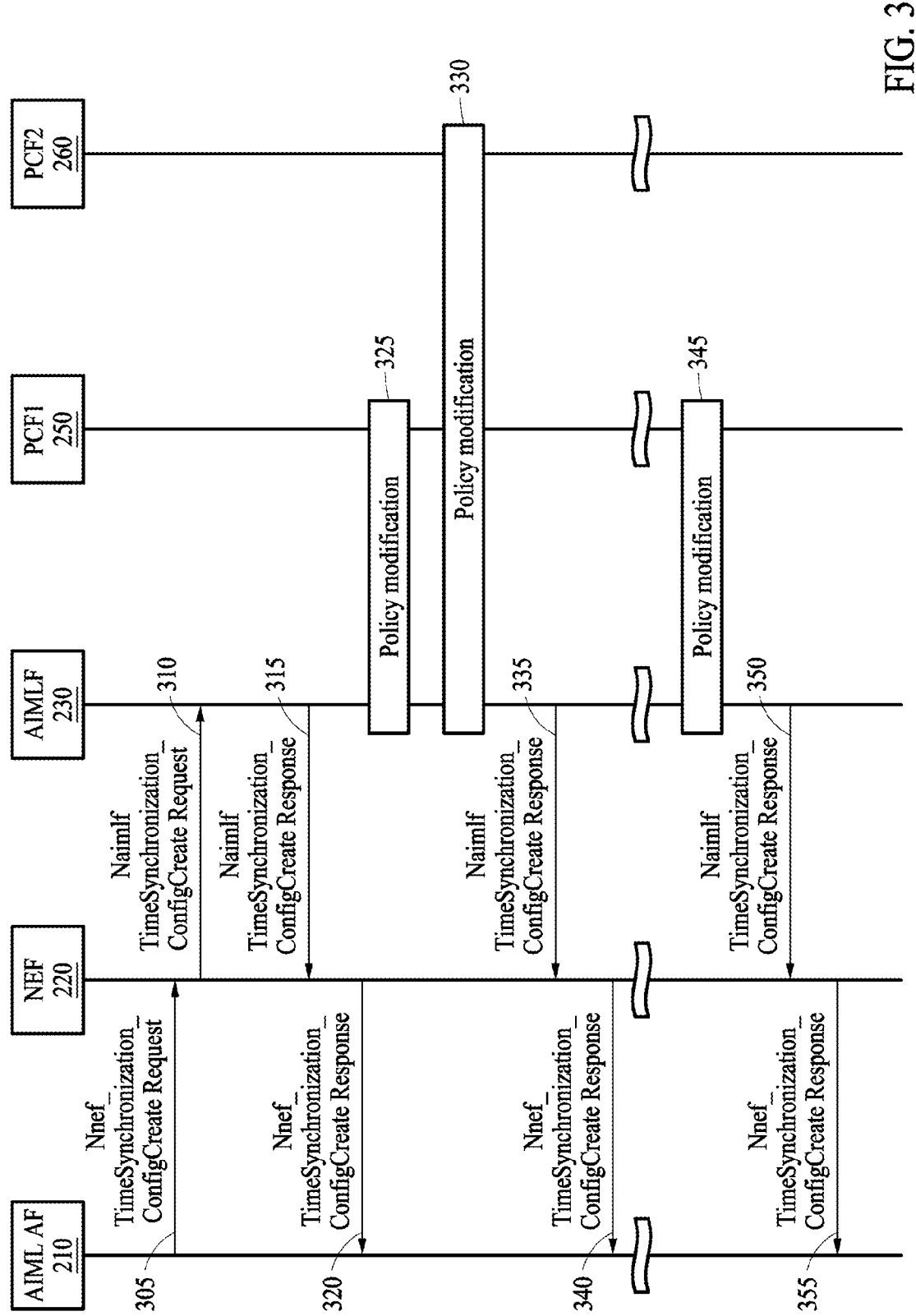
FIG. 3 is a flowchart illustrating a method of activating a time synchronization service, according to an embodiment.

FIG. 3 is a flowchart illustrating a method of activating a time synchronization service, according to an embodiment.

Referring to FIG. 3, according to an embodiment, operations 305 to 355 may be performed sequentially, but are not limited thereto. For example, two or more operations may be performed in parallel. In another example, one or more operations may be omitted.

In operation 305, an AIML AF 210 may create a time synchronization service configuration for a PTP instance by invoking a service operation of Nnef_TimeSynchronization_ConfigCreate. A request (e.g., Nnef_TimeSynchronization_ConfigCreate Request) of the AIML AF 210 may include time synchronization parameters (e.g., time synchronization parameters in Table 4.15.9.3-1 of 3GPP TS 23.502). The request of the AIML AF 210 may be a reference for a target of an AIML AF session and UE (e.g., the UE 150 of FIG. 1) and may include a user plane node ID and a subscription correlation ID.

In operation 310, an NEF 220 may authorize the request of the AIML AF 210. Upon authorization, the NEF 220 may invoke the service operation of Naimlf_TimeSynchronization_ConfigCreate with an AIMLF 230. For example, the NEF 220 may invoke the service operation of Naimlf_TimeSynchronization_ConfigCreate, using the parameters received from the AIML AF 210. According to an embodiment, the AIML AF 210 may directly invoke a service (e.g., the time synchronization service) together with the AIMLF 230. The AIML AF 210 may be part of an operator's trust domain.

In operation 315, the AIMLF 230 may respond with Naimlf_TimeSynchronization_ConfigCreate Response. The Naimlf_TimeSynchronization_ConfigCreate Response may include a PTP instance reference.

In operation 320, the NEF 220 may respond with an Nnef_TimeSynchronization_ConfigCreate Response. The Nnef_TimeSynchronization_ConfigCreate Response may include a reference (e.g., the PTP instance reference) to time synchronization service configuration.

In operations 320 and 330, the AIMLF 230 may use a user-plane node ID and/or a subscription correlation ID to determine corresponding AF sessions and/or target UE. The user-plane node ID and/or the subscription correlation ID may be information included in Naimlf_TimeSynchronization_ConfigCreate. The AIMLF 230 may determine a corresponding AF session and a suitable DS-TT among AF sessions associated with a user-plane node ID and a subscription correlation ID (e.g., the user-plane node ID and the subscription correlation ID included in the Naimlf_TimeSynchronization_ConfigCreate Request), based on parameters (e.g., a requested PTP instance type, a transport protocol, and a PTP profile) included in a Naimlf_TimeSynchronization_ConfigCreate Request.

In operation 335, the AIMLF 230 may notify the NEF 220 with a service operation of Naimlf_TimeSynchronization_ConfigUpdateNotify. The response of the AIMLF 230 may include the current state of a time synchronization service configuration and/or a PTP instance reference.

In operation 340, the NEF 220 may notify the AIML AF 210 with the service operation of Nnef_TimeSynchronization_ConfigUpdateNotify. The response of the NEF 220 may include the current state of a time synchronization service configuration and/or a PTP instance reference.

Operations 345 to 355 may be substantially the same as operations 325 to 340. Accordingly, further description thereof is not repeated herein.

According to an embodiment, time synchronization service parameters (e.g., parameters prescribed in 3GPP TS 23.502) may be used as shown in the table below for the time synchronization service.

TABLE 2

| Time Synchronization Parameter | Description |
|---|---|
| PTP instance type | Identifies the requested PTP instance type as described in clause 5.27.1.4 of TS 23.501 |
| Transport protocol | Identifies the requested transport protocol for PTP instance as described in clause 5.27.1.4 of TS 23.501 |
| PTP Profile | Identifies the PTP profile for the PTP instance as requested by AF. |
| Grandmaster enabled | Indicates whether the AF requests the PTP instance in 5GS to be able to act as a grandmaster for PTP or gPTP (depending on the requested PTP instance type). This is applicable for IEEE Std 1588 [76] or IEEE Std 802.1AS operation. [optional] |
| Grandmaster priority | Indicates a priority used as defaultDS.priority1 when generating Announce message when 5GS acts as (g)PTP GM. Applicable only if the Grandmaster enabled = TRUE. [optional] |
| Time Domain | (g)PTP domain of the PTP instance as defined in IEEE Std 1588. |
| Temporal Validity Condition | Indicates start-time and stop-time attributes that describe the time period when the time synchronization service for a PTP instance is active. [optional] |
| Time synchronization error budget | Indicates the time synchronization budget for the time synchronization service (as described in clause 5.27.1.9 of TS 23.501). [optional] |

Figure 4:
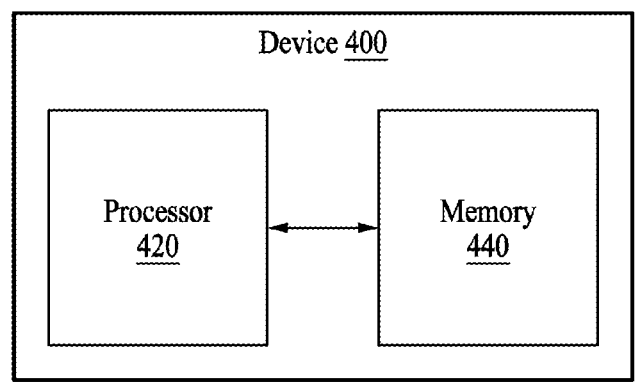
FIG. 4 is a schematic block diagram illustrating a device for a time synchronization service, according to an embodiment.

FIG. 4 is a schematic block diagram illustrating a device for a time synchronization service, according to an embodiment.

Referring to FIG. 4, a device 400 may be a network entity of a 5GS (e.g., the 5GS 100 of FIG. 1). For example, the device 400 may be substantially the same as the AIML AFs 110 and 210, the NEF 220, the AIMLFs 130 and 230, the UDR 240, and/or the PCF1 250 and the PCF2 260 described with reference to FIGS. 1 to 3. The device 400 may include a memory 440 and a processor 420.

The memory 440 may store instructions (or programs) executable by the processor 420. For example, the instructions may include instructions for performing an operation of the processor 420 and/or an operation of each component of the processor 420.

The processor 420 may process data stored in the memory 440. The processor 420 may execute computer-readable code (e.g., software) stored in the memory 440 and instructions triggered by the processor 420.

The processor 420 may be a hardware-implemented data processing device having a circuit that is physically structured to execute desired operations. For example, the desired operations may include code or instructions in a program.

For example, the hardware-implemented data processing device may include a microprocessor, a CPU, a processor core, a multi-core processor, a multiprocessor, an ASIC, and an FPGA.

Operations performed by the processor 420 may be substantially the same as the operations performed by the AIML AFs 110 and 210, the NEF 220, the AIMLFs 130 and 230, the UDR 240, and/or the PCF1 250 and the PCF2 260 described with reference to FIGS. 1 to 3. Accordingly, further description thereof is not repeated herein.

The components described in the embodiments may be implemented by hardware components including, for example, at least one digital signal processor (DSP), a processor, a controller, an ASIC, a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of a time synchronization service for federated learning (FL) of user equipment (UE) in a fifth generation (5G) network, the method comprising:
  receiving, by an artificial intelligence/machine learning function (AIMLF), a subscription request for UE capability information for an FL time synchronization service from an artificial intelligence/machine learning application function (AIML AF); and
  transmitting, by the AIMLF, the UE capability information to the AIML AF, in response to the subscription request.

2. The method of claim 1, wherein the capability information comprises availability of the UE and a capability of the UE for the FL.

3. The method of claim 1, wherein the receiving comprises:
  receiving, by a network exposure function (NEF), the subscription request from the AIML AF; and
  receiving, by the AIMLF, the subscription request from the NEF.

4. The method of claim 1, wherein the transmitting comprises:
  transmitting, by the AIMLF, the UE capability information to a network exposure function (NEF); and
  transmitting, by the NEF, the UE capability information to the AIML AF.

5. The method of claim 1, wherein the subscription request comprises a data network name (DNN) and single-network slice selection assistance information (S-NSSAI).

6. The method of claim 5, wherein the subscription request further comprises a list of identifications (IDs) of pieces of the UE.

7. The method of claim 6, wherein the list is intended to limit subscription to the UE capability information of one or more pieces of UE among pieces of the UE.

\* \* \* \* \*